United States Patent
Brabson et al.

(10) Patent No.: US 8,335,916 B2
(45) Date of Patent: Dec. 18, 2012

(54) SECURE REQUEST HANDLING USING A KERNEL LEVEL CACHE

(75) Inventors: Roy F. Brabson, Raleigh, NC (US); Andrew K. Tracy, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 12/021,544

(22) Filed: Jan. 29, 2008

(65) Prior Publication Data

US 2009/0193251 A1 Jul. 30, 2009

(51) Int. Cl.
*H04L 29/06* (2006.01)

(52) U.S. Cl. ........ 713/151; 713/150; 713/164; 709/217; 709/230; 709/237; 709/245; 726/26

(58) Field of Classification Search .................. 713/150, 713/151, 164; 709/217, 230, 237, 245; 726/26
See application file for complete search history.

(56) References Cited

U.S. PATENT DOCUMENTS

| | | | |
|---|---|---|---|
| 5,007,082 A | 4/1991 | Cummins | |
| 5,392,357 A | 2/1995 | Bulfer et al. | |
| 5,541,920 A | 7/1996 | Angle et al. | |
| 5,584,023 A | 12/1996 | Hsu | |
| 5,764,738 A | 6/1998 | Gillon et al. | |
| 5,845,280 A * | 12/1998 | Treadwell et al. | 1/1 |
| 5,931,928 A | 8/1999 | Brennan et al. | |
| 5,987,140 A | 11/1999 | Rowney et al. | |
| 6,094,485 A | 7/2000 | Weinstein et al. | |
| 6,141,705 A | 10/2000 | Anand et al. | |
| 6,163,812 A * | 12/2000 | Gopal et al. | 719/310 |
| 6,175,917 B1 | 1/2001 | Arrow et al. | |
| 6,370,599 B1 | 4/2002 | Anand et al. | |
| 6,397,331 B1 | 5/2002 | Ober et al. | |
| 6,434,620 B1 | 8/2002 | Boucher et al. | |
| 6,704,871 B1 | 3/2004 | Kaplan et al. | |
| 6,807,636 B2 | 10/2004 | Hartman et al. | |
| 6,934,761 B1 * | 8/2005 | Curtis | 709/237 |
| 7,073,181 B2 | 7/2006 | Gambino | |
| 7,076,803 B2 | 7/2006 | Bruton et al. | |
| 7,089,294 B1 * | 8/2006 | Baskey et al. | 709/219 |
| 7,149,892 B2 | 12/2006 | Freed et al. | |
| 7,181,766 B2 | 2/2007 | Bendinelli et al. | |
| 7,246,233 B2 | 7/2007 | Brabson et al. | |
| 7,302,564 B2 | 11/2007 | Berlin | |

(Continued)

OTHER PUBLICATIONS

Hu et al., "Adaptive Fast Path Architecture", Mar. 2001, IBM Journal of Research and Development, vol. 45, No. 2, pp. 191-206.*

(Continued)

*Primary Examiner* — Nathan Flynn
*Assistant Examiner* — Sarah Su
(74) *Attorney, Agent, or Firm* — Patents on Demand P.A.; Brian K. Buchheit; Scott M. Garrett

(57) ABSTRACT

The present invention discloses a system, method, apparatus, and computer usable product code for handling requests. The invention can include a kernel level cache, a request handling service, and a transport layer security service. The kernel level cache can store request handling data. The request handling service can handle secure requests at a transport layer of a kernel when request handling data is present in the kernel level cache. The transport layer security service can handle encryption/decryption operations for the secure requests and request responses at the transport layer.

20 Claims, 2 Drawing Sheets

U.S. PATENT DOCUMENTS

| | | | |
|---|---|---|---|
| 7,353,380 B2 | 4/2008 | VanHeyningen | |
| 7,398,389 B2 | 7/2008 | Teal et al. | |
| 7,441,119 B2 | 10/2008 | Brabson et al. | |
| 7,571,309 B2 | 8/2009 | Kim et al. | |
| 7,702,906 B1 | 4/2010 | Karr et al. | |
| 7,870,384 B2 | 1/2011 | Brabson et al. | |
| 7,873,829 B2 | 1/2011 | Brabson et al. | |
| 2002/0112167 A1 | 8/2002 | Boneh et al. | |
| 2002/0146128 A1 | 10/2002 | Mauro et al. | |
| 2002/0152403 A1 | 10/2002 | Hand et al. | |
| 2003/0005122 A1 | 1/2003 | Freimuth et al. | |
| 2003/0014623 A1 | 1/2003 | Freed et al. | |
| 2003/0014625 A1 | 1/2003 | Freed et al. | |
| 2003/0014628 A1 | 1/2003 | Freed et al. | |
| 2003/0014650 A1 | 1/2003 | Freed et al. | |
| 2003/0046585 A1 | 3/2003 | Minnick | |
| 2003/0069016 A1* | 4/2003 | Bahl et al. | 455/432 |
| 2003/0105952 A1 | 6/2003 | Brabson et al. | |
| 2003/0105957 A1 | 6/2003 | Brabson et al. | |
| 2003/0105977 A1* | 6/2003 | Brabson et al. | 713/201 |
| 2004/0083281 A1* | 4/2004 | Makagon et al. | 709/223 |
| 2004/0088567 A1* | 5/2004 | Lamotte | 713/200 |
| 2004/0260921 A1* | 12/2004 | Treadwell | 713/150 |
| 2005/0097546 A1* | 5/2005 | Johnson | 717/177 |
| 2005/0136949 A1* | 6/2005 | Barnes | 455/461 |
| 2005/0257045 A1 | 11/2005 | Bushman et al. | |
| 2006/0005237 A1* | 1/2006 | Kobata et al. | 726/12 |
| 2006/0095758 A1* | 5/2006 | Kim et al. | 713/151 |
| 2007/0025370 A1* | 2/2007 | Ghasem et al. | 370/401 |
| 2007/0083665 A1* | 4/2007 | Miao | 709/230 |
| 2008/0215877 A1 | 9/2008 | Brabson et al. | |
| 2008/0216150 A1 | 9/2008 | Brabson et al. | |
| 2009/0119742 A1* | 5/2009 | Graziani et al. | 726/1 |
| 2009/0193251 A1 | 7/2009 | Brabson et al. | |
| 2009/0212928 A1* | 8/2009 | Aijaz | 340/426.1 |
| 2010/0098060 A1* | 4/2010 | Strathmeyer et al. | 370/352 |
| 2010/0306540 A1* | 12/2010 | Yamada et al. | 713/168 |
| 2011/0170692 A1* | 7/2011 | Konrad et al. | 380/260 |

OTHER PUBLICATIONS

Overby, Lin., "Got the world on your shoulders?", Aug. 2005, z/OS Hot Topics Newsletter, Issue 13, pp. 40-42.*

Soltis, Frank G., "What is an iSeries?", Sep. 1, 2003, iSeries News, pp. 1-3.*

Hu, et al., "Adaptive Fast path Architecture," Mar. 2001, IBM Journal of Research and Development, vol. 45, No. 2, pp. 191-206 [retrieved Sep. 30, 2011] retrieved from the Internet:<http://findarticles.com/p/articles/mi_qa3751/is_200103/ai_n8944849/>.

Overby, "Got the world on your shoulders?", Aug. 2005, z/OS Hot Topics Newsletter, Issue 13, pp. 40-42.

Soltis, "What is an iSeries?", Sep. 1, 2003, iSeries News, pp. 1-3 [retrieved Sep. 30, 2011] retrieved from the internet:<https://cs.senecac.on.ca/-tmckenna/IBC233/What_is_an_iSeries.htm>.

Bach, M.J., "The Design of the UNIX Operating System," Prentice-Hall, 1986, p. 20.

* cited by examiner

SECURE REQUEST HANDLING USING A KERNEL LEVEL CACHE

BACKGROUND OF THE INVENTION

The present invention relates to the field of secure Web request handling and, more particularly, to secure request handling using a kernel level cache.

A number of HTTP servers implement a cache accelerator that is a kernel based cache that is able to handle some requests at the System Licensed Internal Code (SLIC) level of a communication's stack, which refers to a stack of the various layers of abstraction present in a computing device. Use of a kernel based cache can improve efficiency, scale, and performance by quickly processing requests for kernel level cached content without traversing the entire kernel or entering an application space. By not involving an application layer, significant performance benefits can be realized.

Conventional implementations of kernel based caches are not able to handle requests arriving over a secure connection. A typical secure connection, such as a connection conforming to the Secure Sockets Layer (SSL) protocol, represents a secure end-to-end link over which Hypertext Text Transport Protocol (HTTP) or any other application protocol can operate. Each endpoint of the SSL protocol typically resides in the application layer of a communication's stack. It is at the application's layer that encryption/decryption of data occurs. Hence, data is encrypted as it passes through the SLIC level, which prevents requests from being parsed and selectively handled by a kernel based cache.

BRIEF SUMMARY OF THE INVENTION

One aspect of the present invention can include a system, method, apparatus, and computer usable product code for handling requests. The aspect of the invention can include a kernel level cache, a request handling service, and a transport layer security service. The kernel level cache can store a set of request handling data. The request handling service can handle secure requests at a transport layer of a kernel when request handling data is present in the kernel level cache. The transport layer security service can handle encryption/decryption operations for the secure requests messages at the transport layer.

Another aspect of the present invention can include a method for handling requests that receives a request from a remotely located client over a secure communication channel. A transport layer security service for the secure communication channel can execute within a transport layer of a kernel to decrypt content of the request that was previously encrypted within the secure communication channel. A request handling service can execute to determine if the request is able to be handled using a kernel level cache. The request handling service executes within the transport layer of the kernel. When the request handling service indicates that the request is able to be handled using the kernel level cache, a response to the request can be generated at the transport layer using the kernel level cache. When the request handling service indicates that the request is not able to be handled using the kernel level cache, the request can be conveyed to an application layer where an application-level handling service executes to produce a response to the request. The transport layer security service can execute to encrypt the response for conveyance over the secure communication channel to the remotely located client. When the request is able to be handled using the kernel level cache, the request is handled without requiring the request to be conveyed beyond the transport layer of the kernel.

DETAILED DESCRIPTION OF THE INVENTION

Figure 1:
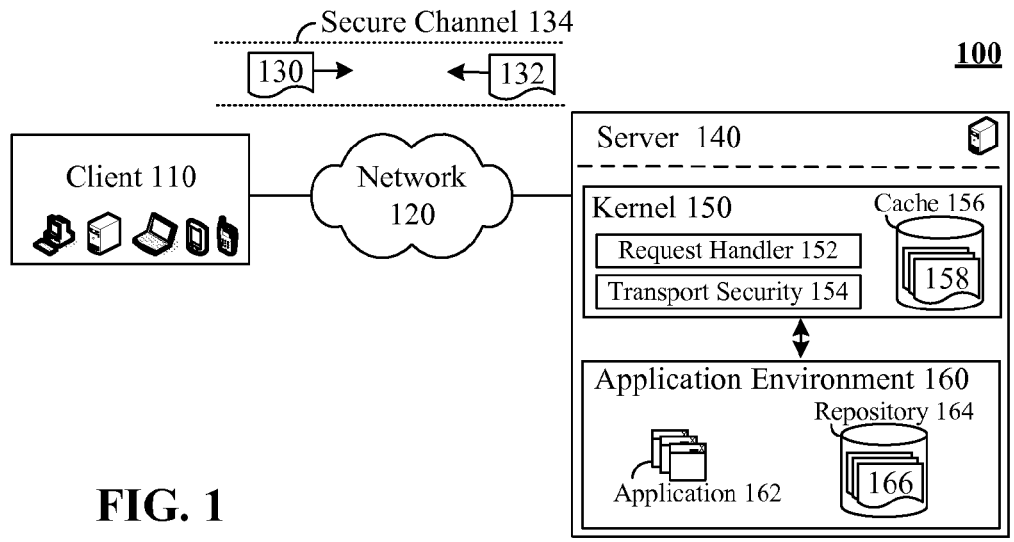
FIG. 1 is a schematic diagram of a system for handling secure requests within a transport layer of a kernel using a kernel level cache in accordance with an embodiment of the inventive arrangements disclosed herein.

The present invention discloses a solution for handling secure requests using a kernel level cache. More specifically, the invention includes transport layer security (TSL) service and an acceleration service that uses a kernel based cache within a kernel at a transport layer of a communication's stack. Within the transport layer, secure communications are first handled by the transport layer security service, which performs encryption and decryption operations. Hence, content for incoming and outgoing communications is "in the clear" or is not encrypted at the sockets layer. The acceleration service that utilizes the kernel level cache executes between the TSL service and the sockets layer after incoming data has been decrypted and before outgoing data is encrypted. Thus, transport layer request handling can be performed using the kernel level cache regardless of whether a communication is secure or not.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for handling secure requests within a transport layer of a kernel 150 using a kernel level cache 156 in accordance with an embodiment of the inventive arrangements disclosed herein. In system 100, a client 110 can issue a request 130, which is conveyed over a network 120 to server 140 within a secure communication channel 134. A kernel 150 of the server 140 can process the request 130 through a communication stack. Within a transport layer, a transport security 154 program can handle the secure handshake for a connection, along with the encryption/decryption of data conveyed across the secure communication channel 134. Thus, a request 130 conveyed over the secure communication channel 134 as an encrypted message is handled "in the clear" from the perspective of applications 162 executing in the application environment 160 of the server 140 and from a perspective of a transport layer request handler 152, which handles the request 130 after it is processed by the transport security 154 program.

The request handler 152 is able to search a kernel level cache 156 for cached data 158, which can satisfy the request 130. When found, the request handler 152 can immediately generate a response 132 using the data 158 from the cache 156, thereby shortcutting the request handling process at the transport layer. When the request 130 is unable to be satisfied by data 158 in the cache 158, it can be conveyed to the application environment 160, where an application 162 can execute to generate a response 132 to the request 130 using data 166 in the repository 164.

As shown in system 100, the secure communication channel 134 represents a communication path within which digital data can be conveyed between the client 110 and the server 140 in accordance with a secure protocol. The channel 134 can have two endpoints, one at the client 110 and another at the server 140, were data is encrypted/decrypted at each endpoint so that only encrypted data is conveyed over channel 134. The encryption/decryption operations can utilize public/private key pairs, digital certificates, and the like. Commonly used secure protocols for channel 134 can include, but are not limited to, a Secure Socket Layer (SSL) protocol, a Transport Layer Security (TLS) protocol, and the like.

Any of a number of internet protocols can be used to transfer data (e.g., request 130 and response 132) across the secure communication channel 134. For example, protocols can include Hyper Text Transfer Protocol (HTTP) protocol (e.g., HTTPS), Network News Transfer Protocol (NNTP), Session Initiation Protocol (SIP), SSI (Simple Sensor Interface) protocol, File Transfer Protocol (FTP), Gopher, Network File System (NFS), Network Time Protocol (NTP), short message peer-to-peer protocol (SMPP), Simple Mail Transfer Protocol (SMTP), Simple Network Management Protocol (SNMP), TELNET, and the like.

The kernel 150 can be a central component of an operating system (OS) of server 140. The kernel 150 can be responsible for managing resources (e.g., the communication between hardware and software components of server 140). As a basic component of an operating system, the kernel provides the lowest-level abstraction layer for the resources (e.g., memory, processors, I/O devices, etc.) that applications 162 must control to perform their function. That is, the kernel 150 represents a lowest level of abstraction that is implemented in software. The operating system (OS) and applications of server 140 depend upon the kernel 150 and reside in higher levels of abstraction.

The request handler 152 and the transport security 154 can be computer program products (e.g., software) consisting of a set of computer usable instructions that direct the server 140 to perform a set of programmatic actions. The handler 152 and security 154 can be executed at the System Licensed Internal Code (SLIC) level of the kernel 150 in one embodiment.

The request handler 152 can utilize techniques of any kernel level cache 156, such as techniques implemented by a Fast Response Cache Accelerator (FRCA) or by a component of an Adaptive Fast-Path Architecture (AFPA). For example, the request handler 152 can include a set of kernel exits, which are used to parse incoming request data. The parsed data can be compared against unique identifiers for data objects 158 of the cache 156. The unique identifiers for the data objects 158 can be URIs, although any unique identifier can be utilized. The data objects 158 will often include static Hyper Text Markup Language (HTML) pages. In one embodiment, the data objects 158 can also include dynamic Web content (e.g., JAVA script produced content).

The transport security 154 can handle a secure handshake along with operations for encrypting and decrypting data. In one embodiment, the transport security 154 even though it executes within the kernel 150 can maintain security endpoint affinity with an associated application, as though the application were enabled with traditional transport layer security (TSL). For example, a keyring that contains a digital certificate that represents an application during TSL authentication may still have to be accessed under a correct user identity. Before accessing the keyring, the transport security 154 program can replicate an application's security environment including the user identity of the application at a time a policy is mapped. This ensures that only authorized users can be authenticated using a digital certificate. In one embodiment, the transport security 154 program can be executed in an application transparent fashion, as is the case with current Application Transparent-Transport Layer Security (AT-TLS) implementations.

Network 120 can include any hardware/software/and firmware necessary to convey data encoded within carrier waves. Data can be contained within analog or digital signals and conveyed though data or voice channels. Network 120 can include local components and data pathways necessary for communications to be exchanged among computing device components and between integrated device components and peripheral devices. Network 120 can also include network equipment, such as routers, data lines, hubs, and intermediary servers which together form a data network, such as the Internet. Network 120 can also include circuit-based communication components and mobile communication components, such as telephony switches, modems, cellular communication towers, and the like. Network 120 can include line based and/or wireless communication pathways.

Cache 156 and repository 164 represent data stores able to be physically implemented within any type of hardware including, but not limited to, a magnetic disk, an optical disk, a semiconductor memory, a digitally encoded plastic memory, a holographic memory, or any other recording medium. Data stores 156 and 164 can be a stand-alone storage unit as well as a storage unit formed from a plurality of physical devices. Additionally, data can be stored within data stores 156 and 164 in a variety of manners. For example, data can be stored within a database structure or can be stored within one or more files of a file storage system, where each file may or may not be indexed for data searching purposes. Further, data stores 156 and 164 can utilize one or more encryption mechanisms to protect stored data from unauthorized access.

Figure 2:
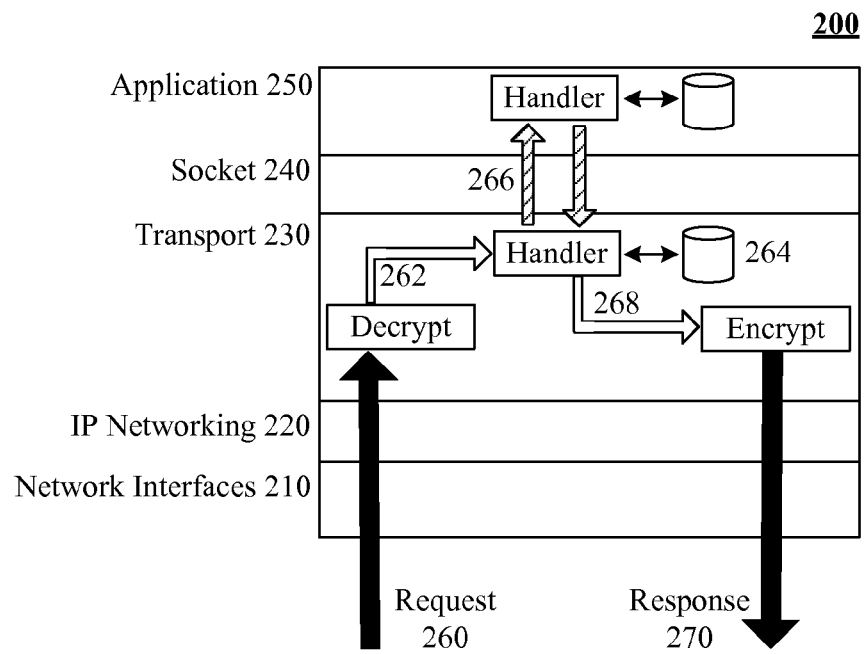
FIG. 2 is a schematic diagram showing multiple layers of a communication stack in which a kernel level cache is situated within a transport layer that is able to situationally handle some incoming requests conveyed over a secure connection in accordance with an embodiment of the inventive arrangements disclosed herein.

FIG. 2 is a schematic diagram 200 showing multiple layers 210-250 of a communication stack in which a kernel level cache is situated within a transport layer 230 that is able to situationally handle some incoming requests 260 conveyed over a secure connection in accordance with an embodiment of the inventive arrangements disclosed herein. The layers 210-250 can represent the layers of abstraction of kernel 150 of system 100.

The communication stack as shown in diagram 200 includes a network interface 210 layer, an IP networking 220 layer, a transport 230 layer, a socket 240 layer, and an application 250 layer. These layers 210-250 are presented for illustrative purposes to demonstrate a series of abstraction layers and to indicate that secure requests are able to be handled at a transport 230 layer of abstraction using content contained in a kernel level cache 264 without requiring application layer processing. For example, the transport 230 layer can be a TCP layer and the handling can occur from programs executing in the TCP stack. The layers 210-250 are to be interpreted in context as being layers of any of a variety of models, such as the Open Systems Interconnection (OSI) model, the TCP/IP network model, and the like.

In diagram 200, an incoming request 260 can be conveyed through the network interfaces and IP networking layers 210-220 to the transport layer 230. In the transport 230 layer, the request 260 can be decrypted 262 and conveyed to a request handler. The request handler can search a kernel level cache 264 for data to satisfy the request. For example, the request can be parsed to determine a URI or other unique identifier, which may reside within the cache 264 along with a corresponding HTML page or other data object. When the cache 264 is able to generate a response, it can be immediately conveyed 268 to an encryption routine of the transport 230 without requiring the request to be conveyed beyond the transport 230 layer. When the cache 264 does not contain data for a response, the request 266 can be conveyed through the socket 240 and application 250 layers to be handled by an application layer program. Once a response is determined, it can be conveyed to an encryption routine executing at the transport 230 layer, which processes the response 270 so that it to be conveyed back to a requesting entity along the secure connection.

Figure 3:
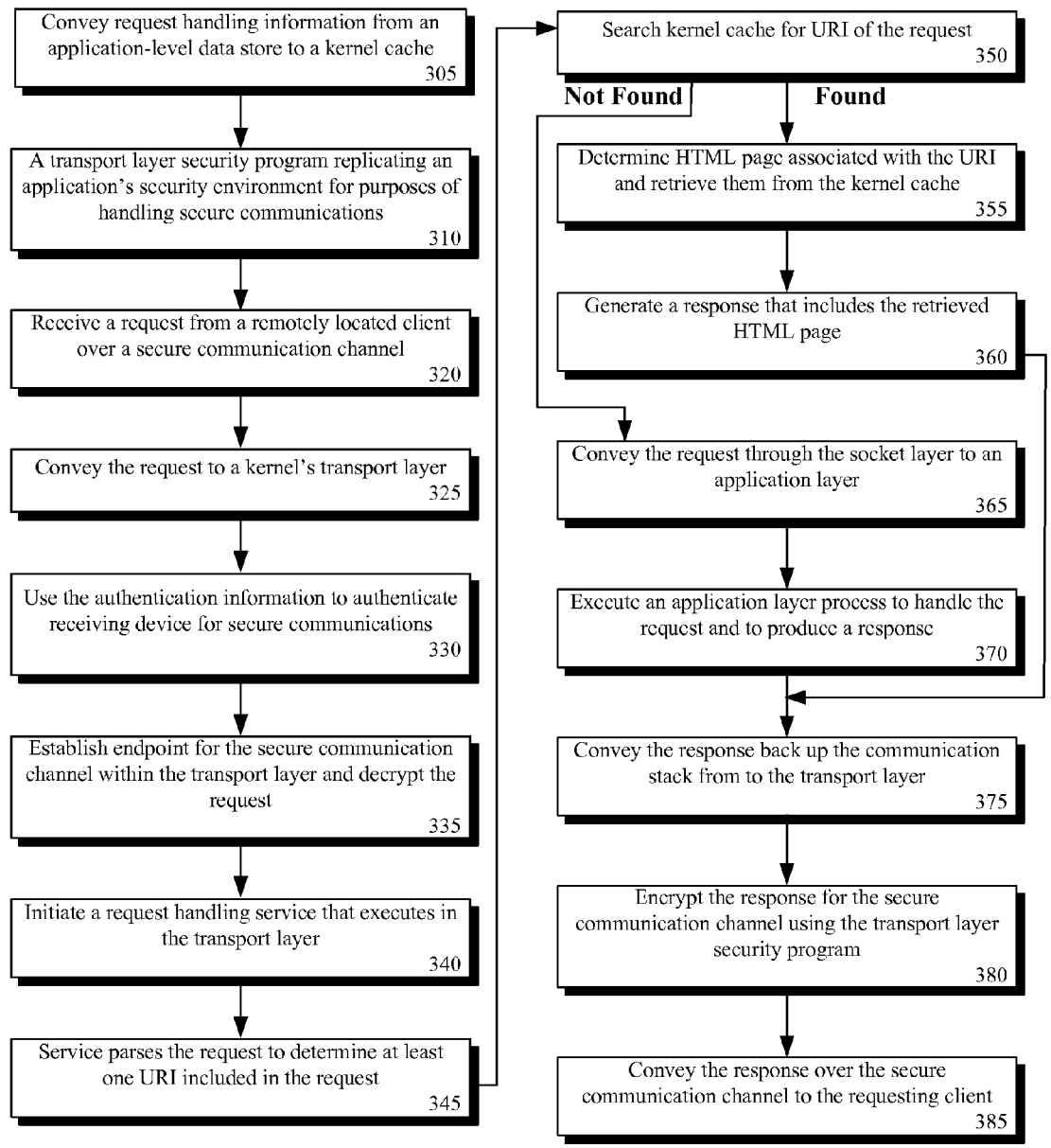
FIG. 3 is a flow chart of a method for secure request handling using a kernel level cache in accordance with an embodiment of the inventive arrangements disclosed herein.

FIG. 3 is a flow chart of a method 300 for secure request handling using a kernel level cache in accordance with an embodiment of the inventive arrangements disclosed herein. The method 300 can be performed in context of system 100 and/or diagram 200.

Method 300 can begin in step 305, where request handling data can be conveyed from an application level data store to a kernel level cache. In step 310, a transport layer security program can replicate an application's security environment for the purposes of handling secure communications. In step 320, a request can be received from a remotely located client over a secure channel. In step 325, the request can be conveyed to a transport layer of a receiving computing device (e.g., Web server).

A kernel level program can use authentication data (replicated in step 310) to authenticate itself for the secure channel, as shown by step 330. In step 335, assuming correct authentication data is provided, a communication endpoint can be established within the transport layer. After the endpoint has been established, the previously encrypted request (received in step 320) can be decrypted. In other words, steps 330 and 335 can together establish a SSL/TLS session. In step 340, a request handling service can be initiated, which executes in the transport layer and that uses a kernel level cache. In step 345, the request handling service can determine at least one Uniform Resource Identifier (URI) or other identifier included in the request. For example, a set of kernel exits can be used to parse the URI specified within the request. As used herein, a URI can be a formatted string that serves as an identifier for a resource, such as an Internet resource. A URI is a path portion of a Uniform Resource Locator (URL) or a Web address. A kernel exit can be a software program able to be triggered and executed within a kernel.

In step 350, the kernel level cache can be searched for this URI or other identifier. When found, the method can progress from step 350 to step 355, where an HTML page or other software object associated with the identifier can be determined and retrieved from the kernel level cached. In step 360, a response can be generated that includes the HTML page or other cache received object.

When no applicable content is found in the kernel level cache, the method can progress from step 350 to step 365, where a request can be conveyed through the socket layer to an application layer. In step 370, an application layer process can execute to handle the request and to produce a response.

In step 375, after a response to the request has been generated, the response can be conveyed back up the communication stack to the transport layer. In step 380, a transport layer security program can encrypt the response for the secure communication channel. In step 385, the response can be conveyed over the secure communication channel to the requesting client.

The flowchart and block diagrams in FIG. 3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for handling requests comprising:
   replicating an application security environment of an application layer of a kernel for use by a transport layer security service, wherein said replicating maintains security endpoint affinity with the application layer;
   the transport layer security service performing authentication actions that utilize authentication data acquired from the application security environment;
   receiving a request from a remotely located client over a secure communication channel;
   executing the transport layer security service for the secure communication channel within a transport layer of the kernel to decrypt content of the request that was previously encrypted within the secure communication channel;
   executing a request handling service to determine if the request is able to be handled using a kernel level cache, wherein the request handling service executes within the transport layer of the kernel;
   upon a determination that the request is able to be handled using the kernel level cache, generating a response to the request at the transport layer using the kernel level cache;
   upon a determination that the request is not able to be handled using the kernel level cache, conveying the request through an application layer of the kernel where an application-level handling service executes to produce a response to the request; and executing the transport layer security service to encrypt the response for conveyance over the secure communication channel to the remotely located client, wherein, upon a determination that the request is able to be handled using the kernel level cache the request is handled without requiring the request to be conveyed beyond the transport layer of the kernel.

2. The method of claim 1, wherein said transport layer security service and said request handling service execute within a Transmission Control Protocol stack, wherein the security endpoint affinity is with an associated application executing within the application layer, wherein the transport layer security service executes in an application transparent fashion in relation to the associated application.

3. The method of claim 1, wherein transport layer security service and said request handling service are System Licensed Internal Code (SLIC).

4. The method of claim 1, wherein said secure communication channel conforms to at least one of a Secure Sockets Layer (SSL) protocol and a Transport Layer Security (TLS) protocol.

5. The method of claim 1, wherein the transport layer security service is a software service that executes in the transport layer and that encrypts the response at the transport layer.

6. The method of claim 1, further comprising:
conveying a set comprising more than one Hyper Text Markup Language (HTML) file from an application level repository to the kernel level cache within which a copy of the conveyed set comprising more than one HTML file is stored;
utilizing a different set comprising more than one kernel exit to parse a Uniform Resource Identifier (URI) specified within the request;
determining whether an HTML file is present in the kernel level cache that corresponds to the parsed URI; and
upon a determination that an HTML file is present that corresponds to the request, providing that HTML as part of the response and handling the request at the transport layer.

7. The method of claim 6, wherein said set comprising more than one HTML file comprises static HTML files.

8. A computer program product for handling requests, the computer program product comprising:
a non-transitory computer usable storage medium having computer usable program code embodied therewith, the computer usable program code comprising:
computer usable program code configured to replicate an application security environment of an application layer of a kernel for use by a transport layer security service, wherein the replication maintains security endpoint affinity with the application layer;
computer usable program code associated with the transport layer security service configured to performing authentication actions that utilize authentication data acquired from the application security environment;
computer usable program code configured to receive a request from a remotely located client over a secure communication channel;
computer usable program code configured to execute the transport layer security service for the secure communication channel within a transport layer of the kernel to decrypt content of the request that was previously encrypted within the secure communication channel;
computer usable program code configured to execute a request handling service to determine if the request is able to be handled using a kernel level cache, wherein the request handling service executes within the transport layer of the kernel; computer usable program code configured to generate a response to the request at the transport layer using the kernel level cache upon a determination that the request handling service indicates that the request is able to be handled using the kernel level cache;
computer usable program code configured to convey the request through an application layer of the kernel where an application-level handling service executes to produce a response to the request upon a determination that the request handling service indicates that the request is not able to be handled using the kernel level cache; and
computer usable program code configured to execute the transport layer security service to encrypt the response for conveyance over the secure communication channel to the remotely located client, wherein upon a determination that the request is able to be handled using the kernel level cache the request is handled without requiring the request to be conveyed beyond the transport layer of the kernel.

9. The computer program product of claim 8, wherein said transport layer security service and said request handling service execute within a Transmission Control Protocol stack, wherein the transport layer security service executes in an application transparent fashion.

10. The computer program product of claim 8, wherein computer usable program code configured to execute the transport layer security service and the request handling service are computer usable program code configured to execute within a System Licensed Internal Code (SLIC) level.

11. The computer program product of claim 8, wherein said secure communication channel conforms to at least one of a Secure Sockets Layer (SSL) protocol and a Transport Layer Security (TLS) protocol.

12. The computer program product of claim 8, wherein the transport layer security service is a software service that executes in the transport layer and that encrypts the response at the transport layer.

13. The computer program product of claim 8, the computer usable program code further comprising:
computer usable program code configured to convey a set comprising more than one Hyper Text Markup Language (HTML) file from an application level repository to the kernel level cache within which a copy of the conveyed set comprising more than one HTML file is stored;
computer usable program code configured to utilize a different set comprising more than one kernel exit to parse a Uniform Resource Identifier (URI) specified within the request; computer usable program code configured to determine whether an HTML file is present in the kernel level cache that corresponds to the parsed URI; and
computer usable program code configured to provide that HTML as part of the response and handling the request at the transport layer upon a determination that an HTML file is present in the kernel level cache that corresponds to the request.

14. The computer program product of claim 13, wherein said set comprising more than one HTML file comprises static HTML files.

15. A system for handling requests comprising:
computer usable program code stored in at least one non-transitory storage medium configured to replicate an application security environment of an application layer of a kernel for use by a transport layer security service, wherein the replication maintains security endpoint affinity with the application layer;

computer usable program code stored in at least one non-transitory storage medium associated with the transport layer security service configured to perform authentication actions that utilize authentication data acquired from the application security environment;

kernel level cache configured to store a set comprising more than one request handling data;

a request handling service configured to handle secure requests at a transport layer of the kernel upon a determination that request handling data is present in the kernel level cache; and the transport layer security service configured to handle encryption and decryption operations for the secure requests and request responses at the transport layer.

16. The system of claim 15, wherein said request handling data stored in the kernel level cache comprises a plurality of software objects, each software object being associated with a unique Uniform Resource Identifier (URI), wherein the request handling service is configured to detect a Uniform Resource Identifier contained within each of the secure requests after each of the secure requests has been decrypted by the transport layer security service, wherein the request handling service is configured to search the kernel level cache for the detected Uniform Resource Identifiers, wherein the request handling service is configured to generate a response comprising a copy of a software object associated with a Uniform Resource Identifier for which a search is conducted that has been found in the kernel level cache, and wherein the transport layer security service is configured to encrypt the response generated by the request handling service before the response is securely conveyed to a requestor that generated the corresponding secure request.

17. The system of claim 15, wherein the request handling service and the transport layer security service are implemented within a Transmission Control Protocol (TCP) stack, wherein the security endpoint affinity is with an associated application executing within the application layer, thereby permitting applications executing in the application layer to function as if these applications were enabled with traditional layer security (TSL) operations as opposed to being enabled through the transport layer security service executing within the kernel.

18. The system of claim 15, wherein the request handling service and the transport layer security service are programmatic services implemented in System Licensed Internal Code (SLIC).

19. The system of claim 15, wherein the request handling service is performed by at least one of a fast response cache accelerator (FRCA) and an Adaptive Fast-Path Architecture (AFPA), and wherein the transport layer security service is an Application Transparent-Transport Layer Security (AT-TLS) service.

20. The system of claim 15, wherein said request handling data comprises a plurality of static HyperText Markup Language (HTML) files, and wherein the secure requests handled by the transport layer security service and the request handling service conform to at least one of a Secure Sockets Layer (SSL) protocol and a Transport Layer Security (TLS) protocol.

\* \* \* \* \*